Oct. 4, 1966   R. B. SMITH ETAL   3,277,200
METHOD FOR PURIFYING META-XYLENE
Filed Oct. 25, 1962
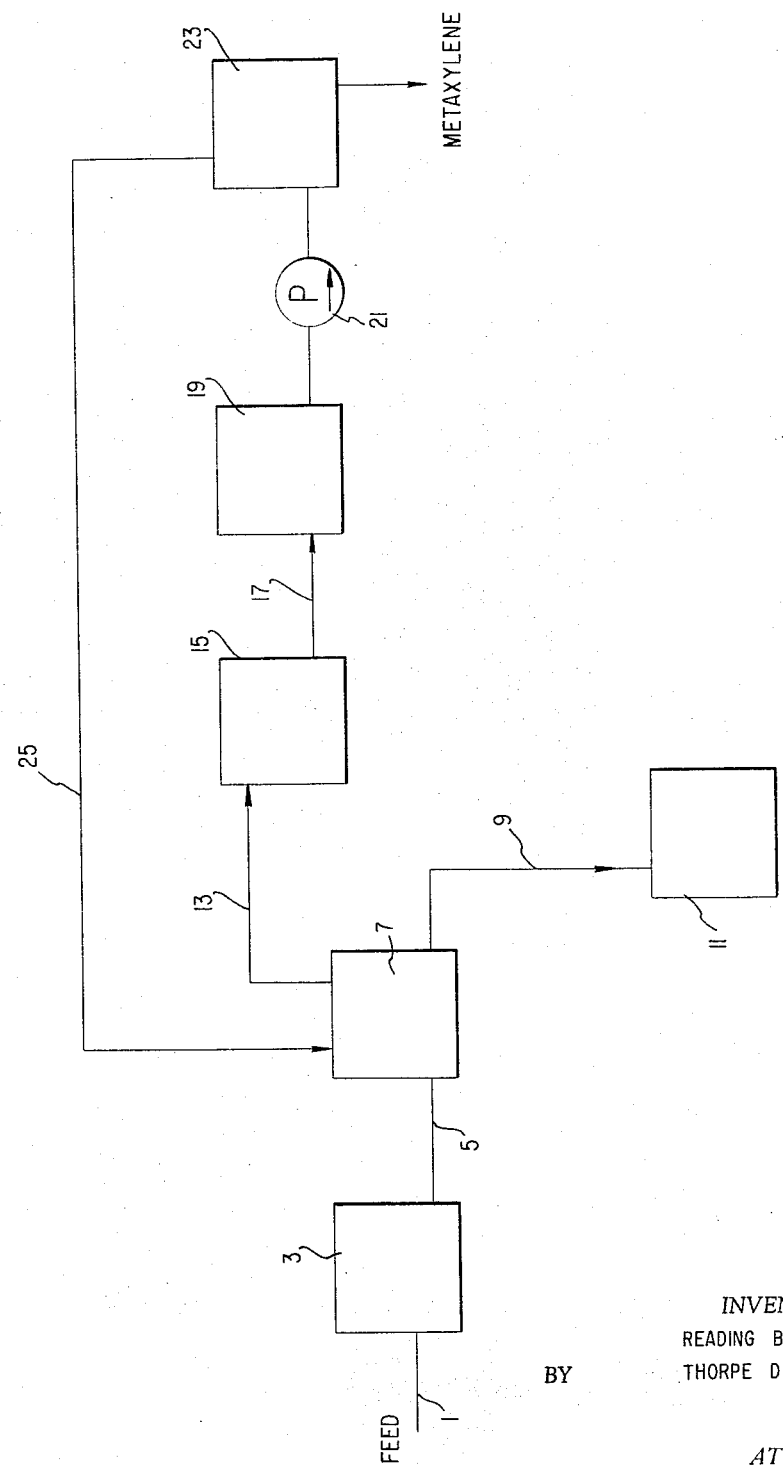
INVENTORS
READING B. SMITH
THORPE DRESSER
BY
ATTORNEY

United States Patent Office 3,277,200
Patented Oct. 4, 1966

3,277,200
METHOD FOR PURIFYING META-XYLENE
Reading Barlow Smith, Flossmoor, and Thorpe Dresser, Markham, Ill., assignors to Sinclair Research, Inc., Wilmington, Del., a corporation of Delaware
Filed Oct. 25, 1962, Ser. No. 232,927
3 Claims. (Cl. 260—674)

The present invention relates to a method for separating meta-xylene from its $C_8$ isomers.

Separation of meta- and para-xylenes by distillation is generally impractical or uneconomical because of the close proximity of their boiling points. Since meta- and para-xylene form a "eutectic" mixture at certain temperatures, crystallization processes have been developed to avert the formation of the eutectic by cooling the mixture just short of the point where the eutectic forms.

In present recovery schemes for separating the $C_8$ aromatics, it is well known that para-xylene, orthoxylene and ethylbenzene are comparatively more easily separated from mixtures containing one or all of the other $C_8$ aromatics than is meta-xylene. For example, since most $C_8$ aromatic mixtures occurring in petroleum processing predominate in meta-xylene, the removal of other $C_8$ aromatics isomeric to it results in a meta-xylene residual which may contain upwards of about 80% meta-xylene, the balance being isomeric $C_8$ contaminants. If the para-xylene content of the contaminants is low, meta-xylene can be simply produced by crystallization therefrom. However, if the para-xylene is the most concentrated of the $C_8$ isomer contaminants and is about 10 to 15% of the mixture, which is often the case, the problem is more difficult. In one instance, for example, to further purify this latter contaminated meta-xylene mixture, the mixture is cooled to just short of the eutectic temperature for meta- and para-xylene, variously reported from —67 to —71° F., to remove the excess para-xylene as solid crystals. This removal of the excess para-xylene and the separation of the ortho-xylene and ethylbenzene, normally by fractionation, ultimately produces a mixture which is a composition of say about 80 to 90%, e.g. 85%, meta-xylene. Efforts to cool this mixture results in the formation of a eutectic mixture of crystals of para- and meta-xylene, so that no useful concentration of meta-xylene results.

In attempts to obtain meta-xylene of good purity from $C_8$ isomers containing the same, many very complex and expensive schemes, such as adductive crystallization, catalytic isomerization, membrane permeation and others have been proposed. The need for a simple and relatively inexpensive method continues to exist.

It has now been found that meta-xylene of improved purity can be separated from mixtures of meta-xylene contaminated with $C_8$ aromatic isomers predominating in para-xylene, by cooling the mixture to produce a slurry of crystals and liquor, said slurry having a solids content of about 25 to 35 weight percent, rapidly heating the slurry to provide it with about 5 to 50, preferably about 5 to 20, B.t.u./lb. of slurry and immediately filtering the heated slurry to separate solids of high meta-xylene content. The meta-xylene cake which will generally be of a purity on the order of approximately 95%, can be subjected, if desired, to a simple repurification step to produce higher purity meta-xylene.

The cooling of the mixture is conducted at a temperature that will produce a slurry having a solids content of between about 25 and 35% and the temperature will usually fall in the range of about —67 to —80° F., preferably about —67 to —70° F. It is important that the heating step of the present invention be conducted rapidly and over a short period of time so as to preferentially dissolve the para-xylene. Usually this heating time period is within about 5 minutes, preferably about 1 to 2 minutes. The amount of heat provided the slurry should be controlled within the limits described above, the actual amount of heat introduced being dependent on the solids content of the slurry and the para-xylene content of the slurry, and is also governed by the desired purity of the resulting meta-xylene cake. Of equal importance, is the immediate filtering, e.g. within about a minute or two, of the slurry after heating.

The meta-xylene-containing mixture treated in accordance with the method of the present invention is a mixture of meta-xylene and about 10 to 15% by weight para-xylene which mixture can also include up to about 3% by weight of ortho-xylene and/or ethylbenzene. Thus, the mixture of the present invention consists essentially of 0 or 1 to about 3% ortho-xylene, 0 or 1 to about 3% ethylbenzene, about 10 to 15 para-xylene with the substantial balance meta-xylene. This mixture can be provided by any of the conventional recovery methods of the art, particularly those directed primarily to the separation of $C_8$ aromatics other than meta-xylene. These separation processes, however, often produce a mixture of meta- and para-xylenes containing an excess of para-xylene, that is, containing greater than 15% by weight of para-xylene.

In the actual practice of the present invention, therefore, it will usually be advisable to remove the excess of para-xylene present and this can be accomplished by cooling the mixture to a temperature at least as low as —66° F. but advantageously to as low as —85° F. to crystallize out the para-xylene. Because meta-xylene-rich solutions possess the peculiarity that they can be cooled as much as 25° F. below the eutectic temperature of meta- and para-xylene for extended periods without precipitating meta-xylene crystals, it is advantageous to provide as low a cooling temperature as possible to improve the purity of meta-xylene to be obtained in accordance with the method of the present invention.

The advantages of the present invention will be better illustrated by the following example:

Example

A mixture having the following composition:

| Component: | Weight percent |
|---|---|
| Ortho-xylene | 1.31 |
| Meta-xylene | 86.91 |
| Para-xylene | 11.68 |
| Ethylbenzene | 0.10 | was cooled to —80° F. with stirring. A stable solution was obtained containing a fine suspension of para-xylene crystals since the solubility limit for para-xylene at 11.68 weight percent is about —73° F. It was established that the crystals were para-xylene by removing a few grams by filter stick and obtaining a melting point of +40° F. corresponding to about 79% para-xylene. The para-xylene crystals were removed from the mixture and a small amount of meta-xylene seeds was put into the filtrate at a temperature of —80° F. and instantaneous crystallization took place. The temperature rose to —67° F. and a heavy slurry of about 30% solids was obtained. A portion of this slurry was filtered to obtain a filtrate and a solid cake which analyzed as follows:

| | Filtrate, Weight Percent | Cake, Weight Percent |
|---|---|---|
| Ortho-xylene | 1.69 | .42 |
| Meta-xylene | 85.37 | 89.64 |
| Para-xylene | 12.94 | 9.94 |
| Ethylbenzene | | |

With no changes in the operating conditions 25% of the remaining slurry was warmed to 39° F. The resulting mixture, a warmed solution clear of all solids, was then returned to the main slurry and allowed to mix and heat the main slurry for about 60 seconds to provide it with about 8 B.t.u.'s per lb. of slurry. The heated slurry was then imediately filtered to obtain a filtrate and solid cake which analyzed as follows:

|  | Filtrate, Weight Percent | Cake, Weight Percent |
|---|---|---|
| Ortho-xylene | 1.53 | 0.08 |
| Meta-xylene | 85.55 | 95.00 |
| Para-xylene | 12.92 | 4.92 |
| Ethylbenzene | | |

The above data demonstrate that in the first case a very slight increase in meta-xylene concentration took place. In the second case, where the slurry was rapidly heated and immediately filtered, a radical and distinct improvement occurred yielding a cake from which nearly pure meta-xylene could be easily produced by recrystallization.

In practical application the present invention can be embodied in a great variety of process flows. Illustrative of a typical process flow in which the present invention can be used is that diagrammatically depicted in the drawing. Referring to the drawing a composition of meta-xylene and para-xylene is sent by feed line 1 into a first crystallizer 3 wherein it is chilled to a temperature of about −67° F. to about −80° F. to remove excess para-xylene. Crystallizer 3 is operated to produce only para-xylene crystals and only para-xylene is crystallized from the feedstock. The slurry of para-xylene crystals and liquor from the para-xylene crystallizers 3 is removed via line 5 and directed to a centrifuge 7 or other suitable filtration means wherein the solid para-xylene cake is removed. The para-xylene cake usually of about 80% purity is returned by means of line 9 to a second stage para-xylene crystallizer 11 for reprocessing. The filtrate, from centrifuge 7 is sent by means of line 13 to a meta-xylene first stage crystallizer 15 which is normally seeded with meta-xylene crystals. The meta-xylene cystallizer 15 is run at a temperature of about −67 to −70° F. and operated to produce a slurry having a solids content of about 25–35 weight percent. The meta-xylene slurry, containing some para-xylene crystals is then withdrawn from meta-xylene crystallizer 15 and passed via line 17 through a heater 19 designed to introduce about 5.50 B.t.u./lb. of the slurry and then through a normal processing pump 21. The placement of the heater 19 before the pump 21 permits advantageous use of the pump as a mixer to distribute the heat throughout the slurry. The slurry passing out of the pump 21 is then immediately sent to centrifuge or filter 23. The filtrate from the centrifuge or filter 23 is returned to the para-xylene crystallizer 7 by way of line 25 and a meta-xylene cake of approximately 95% purity is obtained. The cake can be marketed or alternatively subjected to a simple repurification crystallizing step to produce an even higher purity meta-xylene.

It is claimed:

1. A method for the separation of meta-xylene from a mixture of 0 to 3% ortho-xylene, 0 to 3% ethylbenzene, about 10 to 15% para-xylene with the substantial balance meta-xylene which comprises cooling the mixture to provide a slurry of crystals and liquor having a solids content of about 25 to 35 weight percent, rapidly heating within about 5 minutes the resulting slurry to provide it with about 5 to 50 B.t.u./lb. of slurry and preferentially dissolve the para-xylene and immediately filtering the heated slurry to separate a cake of high meta-xylene content.

2. The method of claim 1 wherein the cooling is conducted at a temperature of about −67 to −80° F.

3. The method of claim 2 wherein the amount of heat provided the slurry is about 5 to 20 B.t.u./lb.

References Cited by the Examiner

UNITED STATES PATENTS

| 2,530,978 | 11/1950 | Mason | 260—674 |
| 2,665,316 | 1/1954 | Bennett | 260—674 |
| 2,884,470 | 4/1959 | Harrison et al. | 260—674 |

DELBERT E. GANTZ, *Primary Examiner.*

P. M. COUGHLAN, *Examiner.*

C. E. SPRESSER, JR., *Assistant Examiner.*